(12) United States Patent
Pattikonda et al.

(10) Patent No.: US 9,152,130 B2
(45) Date of Patent: **\*Oct. 6, 2015**

(54) MOBILE COMMUNICATION WATCH UTILIZING PROJECTED DIRECTIONAL SOUND

(71) Applicants: Ram Pattikonda, Plano, TX (US); Shariq Hamid, Plano, TX (US)

(72) Inventors: Ram Pattikonda, Plano, TX (US); Shariq Hamid, Plano, TX (US)

(73) Assignee: PH Technical Labs, LLC, Plano, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/265,561

(22) Filed: Apr. 30, 2014

(65) Prior Publication Data

US 2014/0233356 A1 Aug. 21, 2014

Related U.S. Application Data

(63) Continuation-in-part of application No. 13/539,565, filed on Jul. 2, 2012, which is a continuation-in-part of application No. 13/353,528, filed on Jan. 19, 2012, now Pat. No. 8,515,505, which is a continuation-in-part of application No. 13/847,613, filed on Mar. 20, 2013.

(60) Provisional application No. 61/434,408, filed on Jan. 19, 2011, provisional application No. 61/817,345, filed on Apr. 30, 2013.

(51) Int. Cl.
| | |
|---|---|
| *H04M 1/00* | (2006.01) |
| *G04G 9/00* | (2006.01) |
| *H04M 1/03* | (2006.01) |
| *H04B 1/3827* | (2015.01) |
| *G04G 21/04* | (2013.01) |

(52) U.S. Cl.
CPC .............. *G04G 9/0064* (2013.01); *G04G 21/04* (2013.01); *H04B 2001/3855* (2013.01); *H04M 1/03* (2013.01); *H04M 2250/16* (2013.01); *H04M 2250/18* (2013.01)

(58) Field of Classification Search
CPC .... H04B 1/385; H04B 1/3888; H04B 1/3833; H04M 1/6058; H04M 1/05; H04M 1/72522; H04M 1/72527; H04M 1/7253; H04M 1/21
USPC ................ 455/41.2, 41.3, 90.3, 550.1, 556.1, 455/556.2, 575.1, 575.6; 368/13
See application file for complete search history.

(56) References Cited

U.S. PATENT DOCUMENTS

| | | | | |
|---|---|---|---|---|
| 6,212,414 | B1 * | 4/2001 | Alameh et al. ............. | 455/575.6 |
| 6,567,523 | B1 * | 5/2003 | Ghassabian ................ | 379/433.1 |
| 7,251,197 | B2 * | 7/2007 | Yoshida et al. ................. | 368/10 |
| 8,301,211 | B2 * | 10/2012 | Lee et al. .................... | 455/575.6 |
| 2014/0171156 | A1 * | 6/2014 | Pattikonda et al. ........ | 455/569.1 |

\* cited by examiner

*Primary Examiner* — Nhan Le
(74) *Attorney, Agent, or Firm* — Michael Diaz

(57) ABSTRACT

A watch worn by a user for interfacing with or integrated with a mobile communication device. The mobile communication device provides wireless communications with other communications devices. The watch also includes an electronics module integrated into the watch. The electronics module includes an interface for interfacing with the mobile communication device integrated into the watch. The user interfaces with the electronic module to perform operations upon the mobile communication device. In addition, the watch includes a mechanism for directing sound to the user's ear for private calling. The watch may also come with one or more pivotable bezel or a keyboard on a strap of the watch to increase the size of the user input.

19 Claims, 20 Drawing Sheets

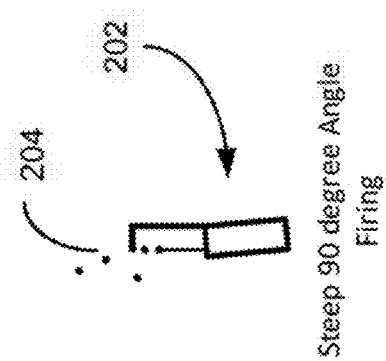
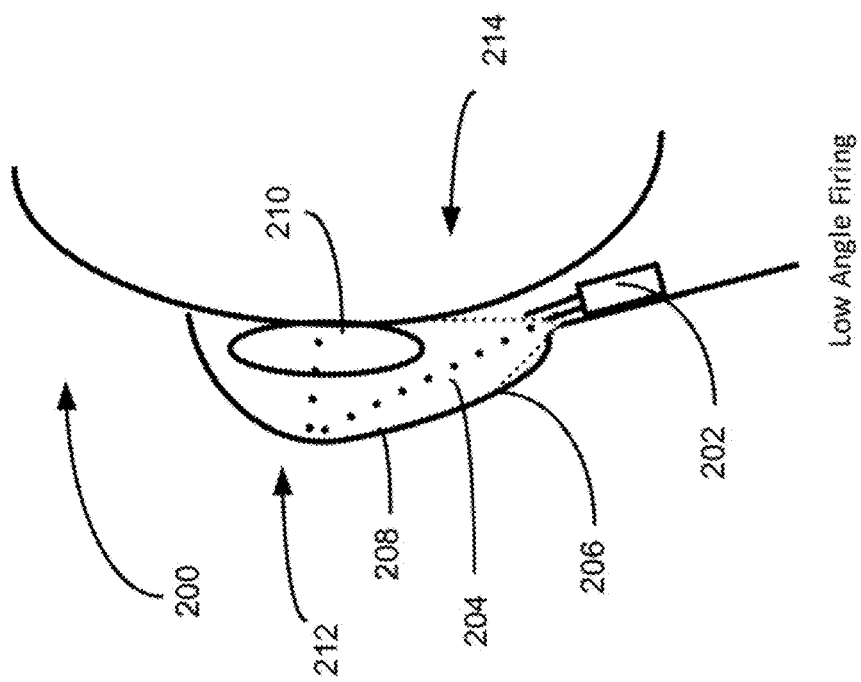

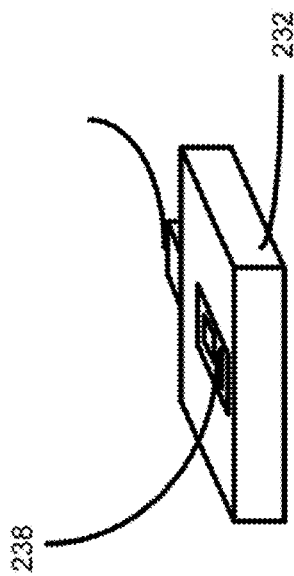
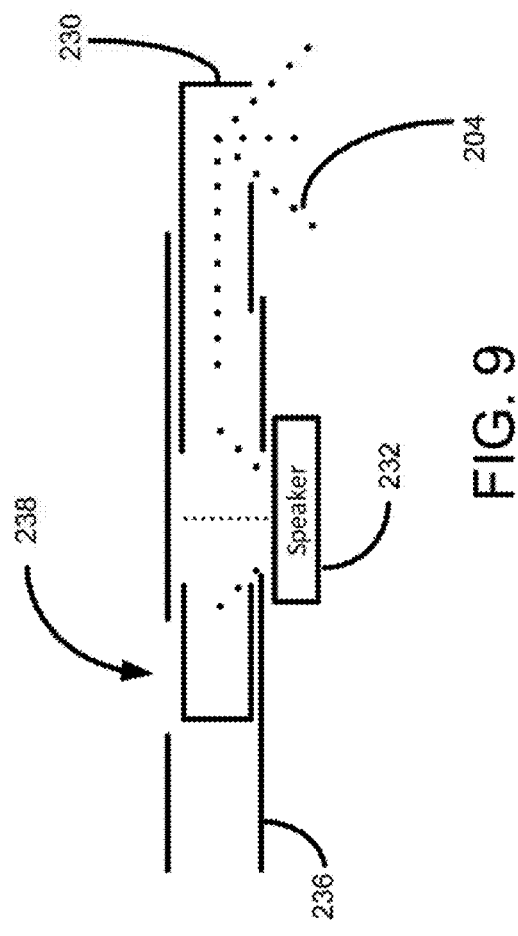
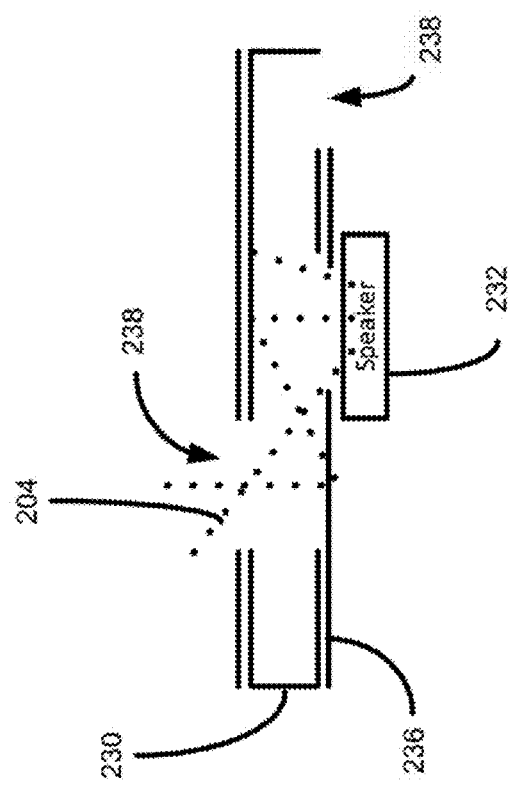

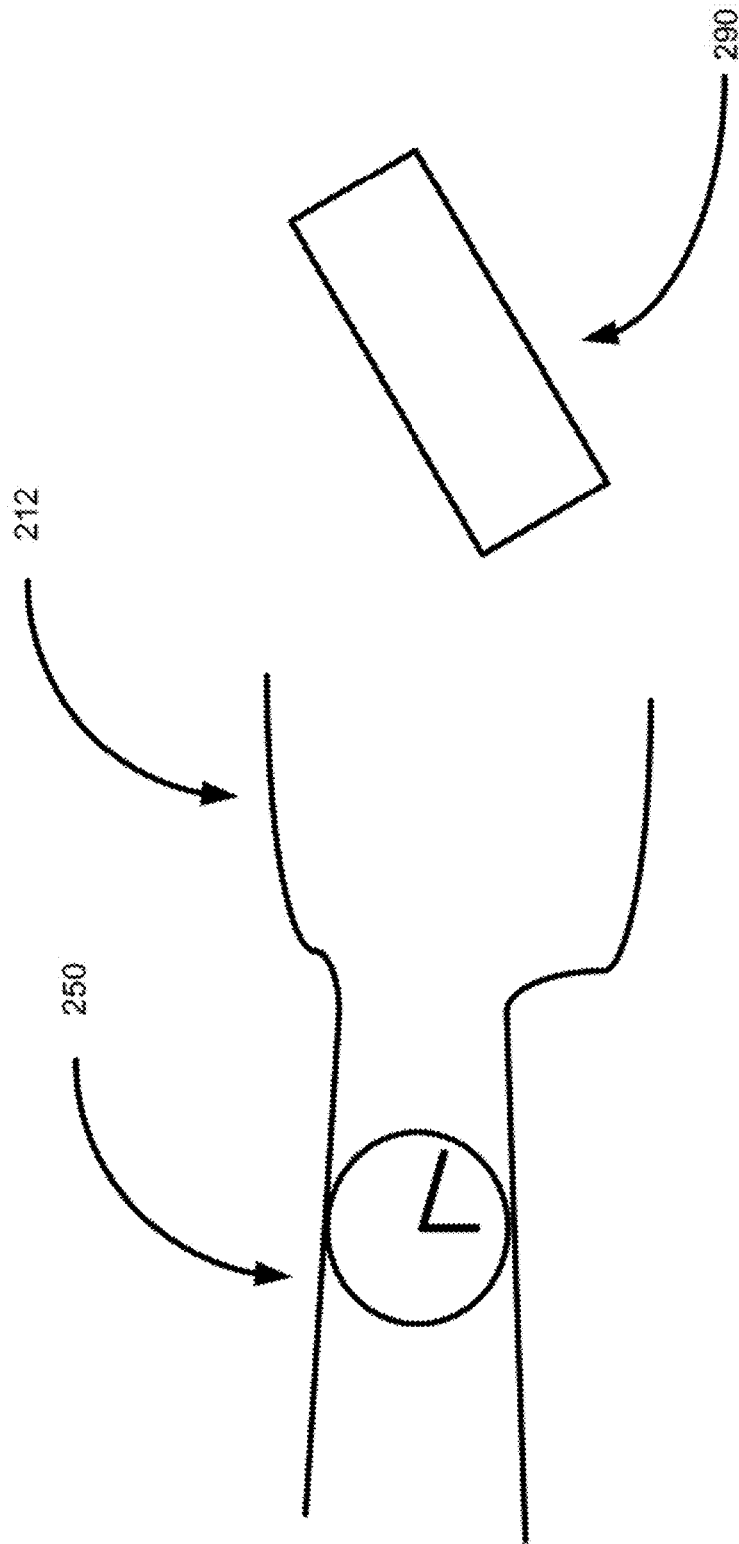

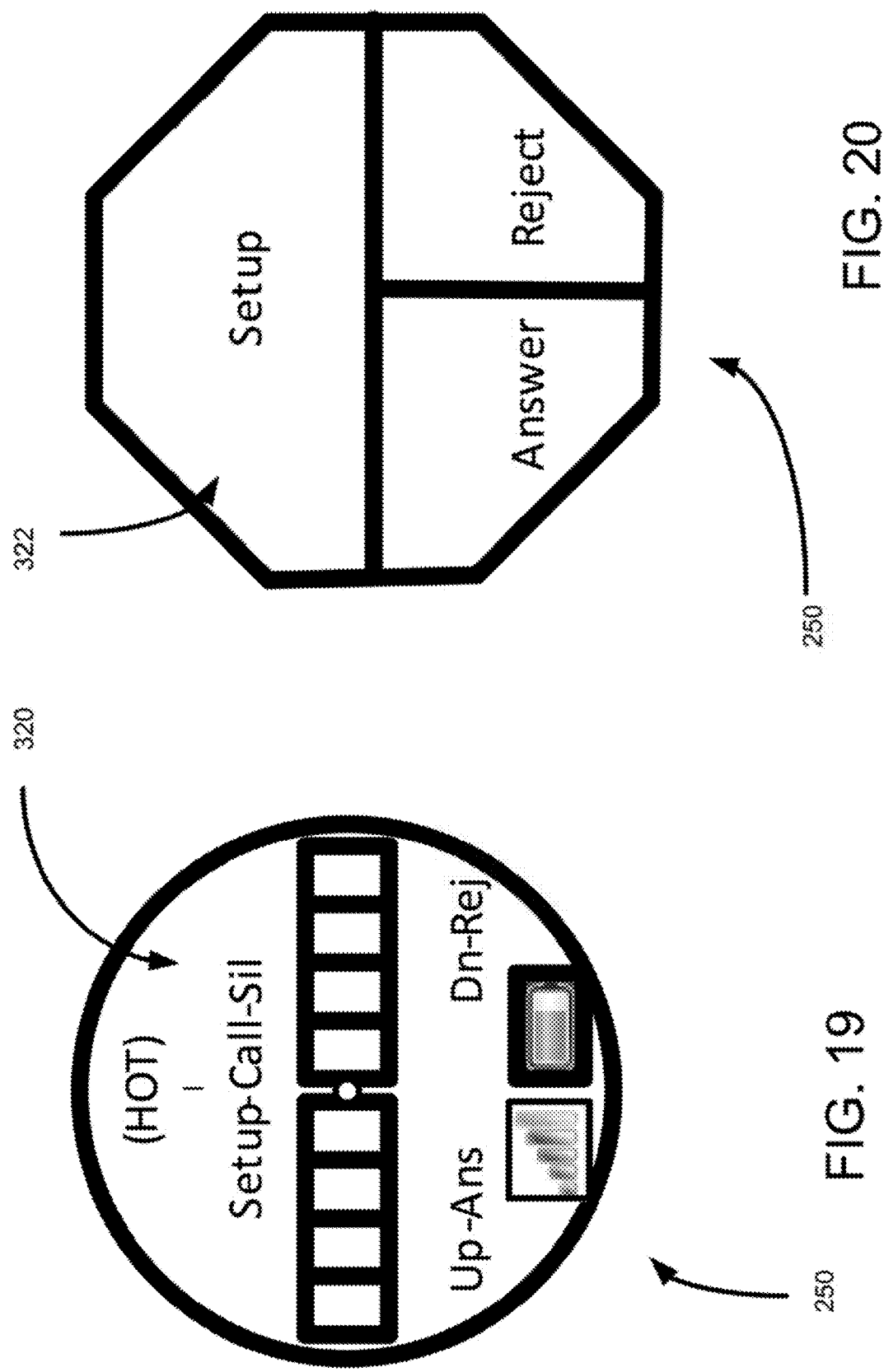

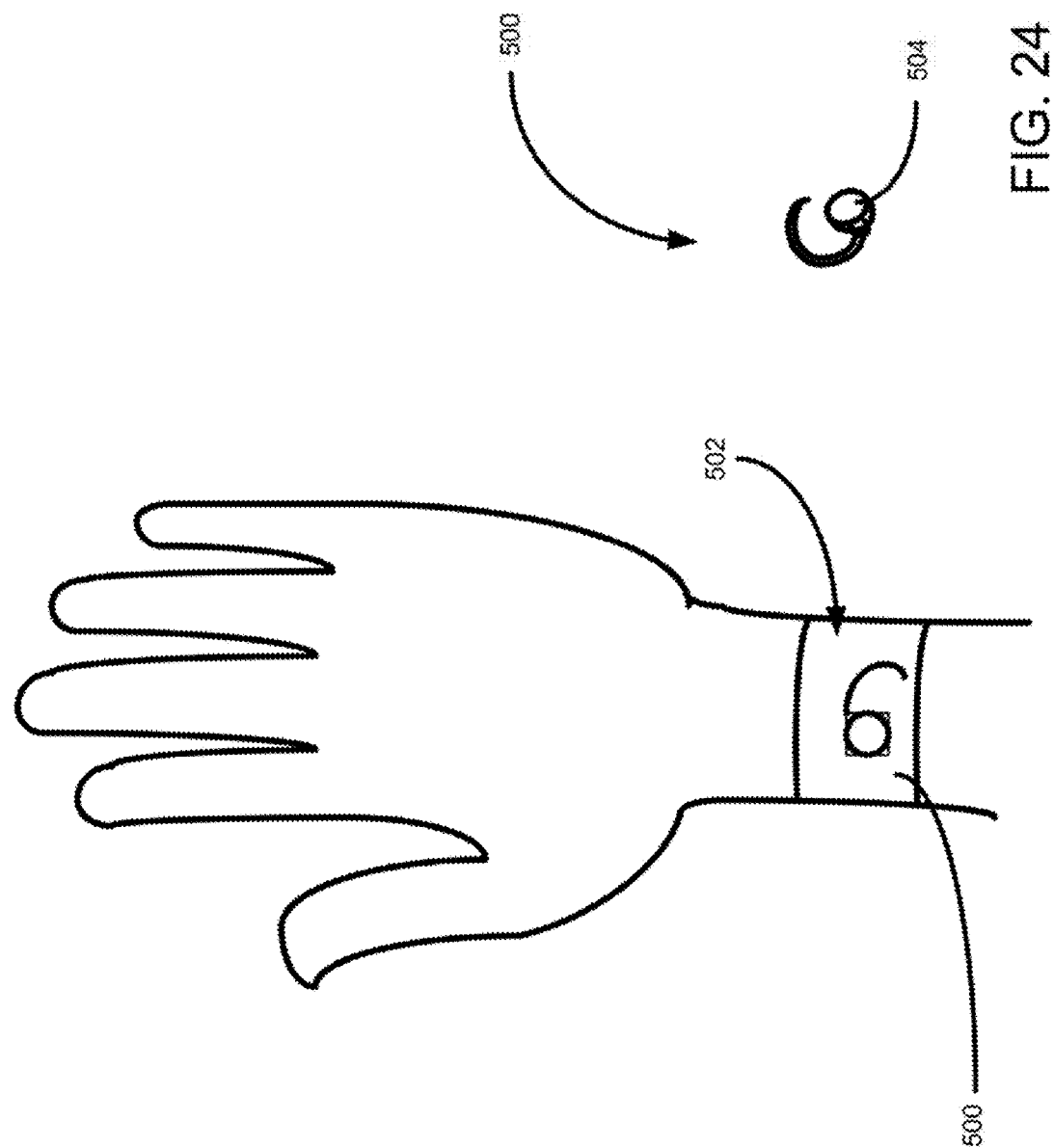

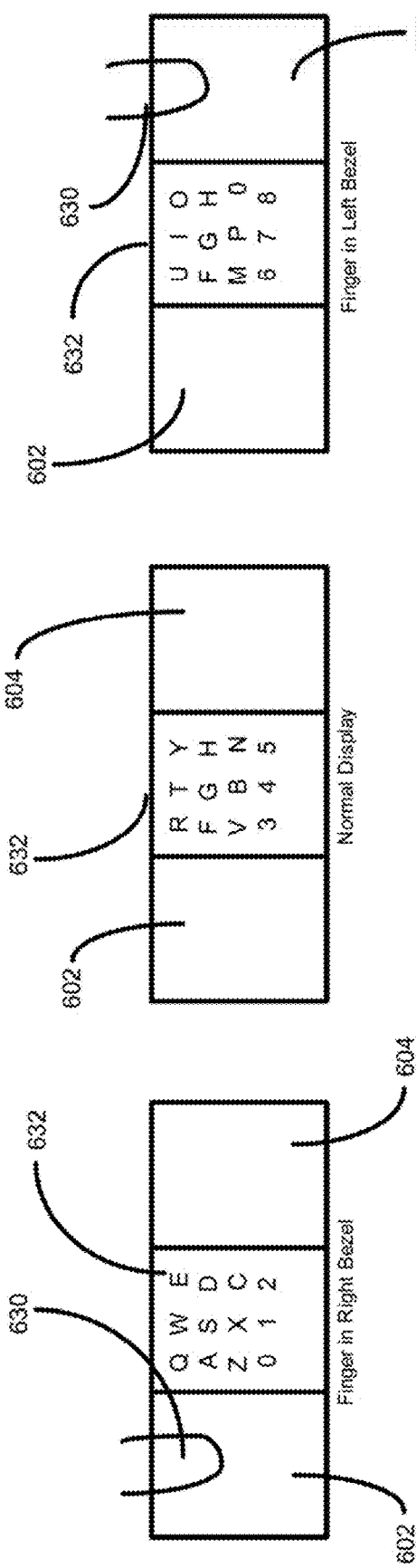
FIG. 27A
FIG. 27B
FIG. 27C
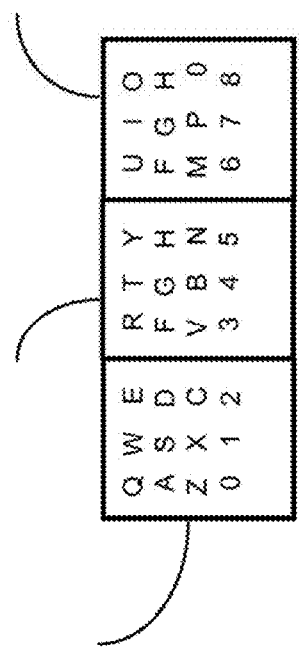
FIG. 27D

MOBILE COMMUNICATION WATCH UTILIZING PROJECTED DIRECTIONAL SOUND

RELATED APPLICATIONS

This utility application is a continuation-in-part of U.S. Utility patent application Ser. No. 13/847,613 filed Mar. 20, 2013 by Ram Pattikonda and Shariq Hamid which claims the benefit of U.S. Utility patent application Ser. No. 13/539,565 filed Jul. 2, 2012 by Ram Pattikonda which claims the benefit of U.S. Utility patent application Ser. No. 13/353,528 by Ram Pattikonda filed Jan. 19, 2012 which claims the benefit of U.S. Provisional Patent Application Ser. No. 61/434,408 by Ram Pattikonda, filed Jan. 19, 2011 is hereby incorporated by reference. In addition, this application claims the benefit of U.S. Provisional Patent Application Ser. No. 61/817,345 by Ram Pattikonda and Shariq Hamid filed Apr. 30, 2013 is hereby incorporated by reference.

BACKGROUND OF THE INVENTION

1. Field of the Invention

This invention relates to communication systems. Specifically, and not by way of limitation, the present invention relates to a mobile communications watch utilizing projected directional sound.

2. Description of the Related Art

The use of mobile phones in our society has become pervasive with their capabilities continuously increasing. With increased capability, the size of the devices is becoming relatively bigger while the fragility of these devices is also increasing. With these increased capabilities, the mobile phones are becoming more like a handheld computer, resulting in awkward use of the device as a phone. Although these devices are used mostly for making and receiving phone calls, they are designed to be more like display devices or handheld computers.

While the analog wrist watch was invented in the late $19^{th}$ century and has been in use, for more than one hundred years, it has not seen much change in terms of technology and integration with the digital world. While there are several digital watches with many features, they are either too complicated to attempt to merge the cell phone into a watch or not enough feature rich functions on these watches. Furthermore, there is no elegant luxury wrist watch that merges the old charm elegance of hand movement with new digital age features such as mobile phone connectivity and digital display.

U.S. patent application Ser. Nos. 13/539,565 and 13/353, 528 both provide unique companion devices built into a wrist watch providing an interface to a mobile phone or other mobile phone device. It would be advantageous to incorporate these companion devices in an improved, elegant and advanced way to provide a mobile phone interface in the watch.

Furthermore, there is a need for a stand-alone wrist watch providing mobile communications through the wrist watch to the user while providing private calling. It is an object of the present invention to provide such an apparatus.

Additionally, it is an object of the present invention to provide a mechanism allowing the projection of directed sound to the user in both the embodiments of the wrist watch. It is an object of the present invention to provide such an apparatus.

Furthermore, there is a need to have an increase in user input work space to enable the user to operate the wrist watch. It is the object of the present invention to provide such a watch.

SUMMARY OF THE INVENTION

In one aspect, the present invention is directed to a standalone watch worn by a user. The watch includes a mobile communication device integrated into the watch. The mobile communication device provides wireless communications with other communications devices. The watch also includes an electronics module integrated into the watch. The electronics module includes an interface for interfacing with the mobile communication device integrated into the watch. The user interfaces with the electronic module to perform operations upon the mobile communication device. In addition, the watch includes a mechanism for directing sound to the user for private calling. The watch may also include one or more pivotable bezel to increase the size of the user interface.

In another embodiment, the present invention is an apparatus worn by a user. The apparatus includes an attachment device for attaching the apparatus to the user, such as wrist straps, and an interface for wirelessly using a separate companion mobile phone from the apparatus. The user interfaces with the apparatus to perform operations upon the mobile phone. The apparatus includes a mechanism to establish a voice channel with the mobile phone for performing phone operations through the mobile phone and a mechanism for projecting directional sound for private calling. In addition, the apparatus includes at least one pivotable bezel or a keyboard on the strap for increasing the size of the user input area.

BRIEF DESCRIPTION OF THE DRAWINGS

FIG. 4 is a front view of a user using a side firing speaker in one embodiment of the present invention;

FIG. 5 is a front view of the side firing speaker firing the sound at a steep 90 degree angle;

FIG. 7 is a front perspective view of a slider located on top of a speaker in another embodiment of the present invention;

FIG. 8 is a side view of the slider of FIG. 7 in a closed position;

FIG. 9 is a side view of the slider of FIG. 7 in the open position;

FIG. 17 is a top view illustrating a user's hand twisting his hand to read the watch;

FIG. 18 is a side view of the watch with the orientation of the user's hand shown in FIG. 17;

FIG. 19 is a front view of the watch face illustrating a first menu display in one embodiment of the present invention;

FIG. 20 is a front view of the watch face illustrating a second menu display in another embodiment of the present invention;

FIG. 23 is a front view of a portable speaker attached to a watch.

FIG. 24 is a top view of the portable speaker module removed from the watch

FIG. 27A is a top view of a user's finger on a right bezel;

FIG. 27B is a top view of a normal display of the watch of FIG. 24;

FIG. 27C is a top view of a user's finger on a left bezel;

FIG. 27D is a top view of the display and bezels and in another embodiment of the present invention.

DESCRIPTION OF THE INVENTION

The present invention is a system and method of utilizing projected sound in a companion device and for a mobile communication device, such a mobile phone as well as a standalone wrist watch providing mobile communications utilizing the projected sound. The present invention is a wrist watch which combines several technologies in a novel implementation to deliver a user friendly and functional mobile companion watch. The present invention provides an apparatus capable of implementing audio phone conversations through a wireless mobile connection while providing a time display. The present invention may provide many convenience features, such as an interface to a mobile phone's application or integrated mobile phone, display live information such as weather and stocks, and provide a gesture-based interface with the phone.

Figure 1:
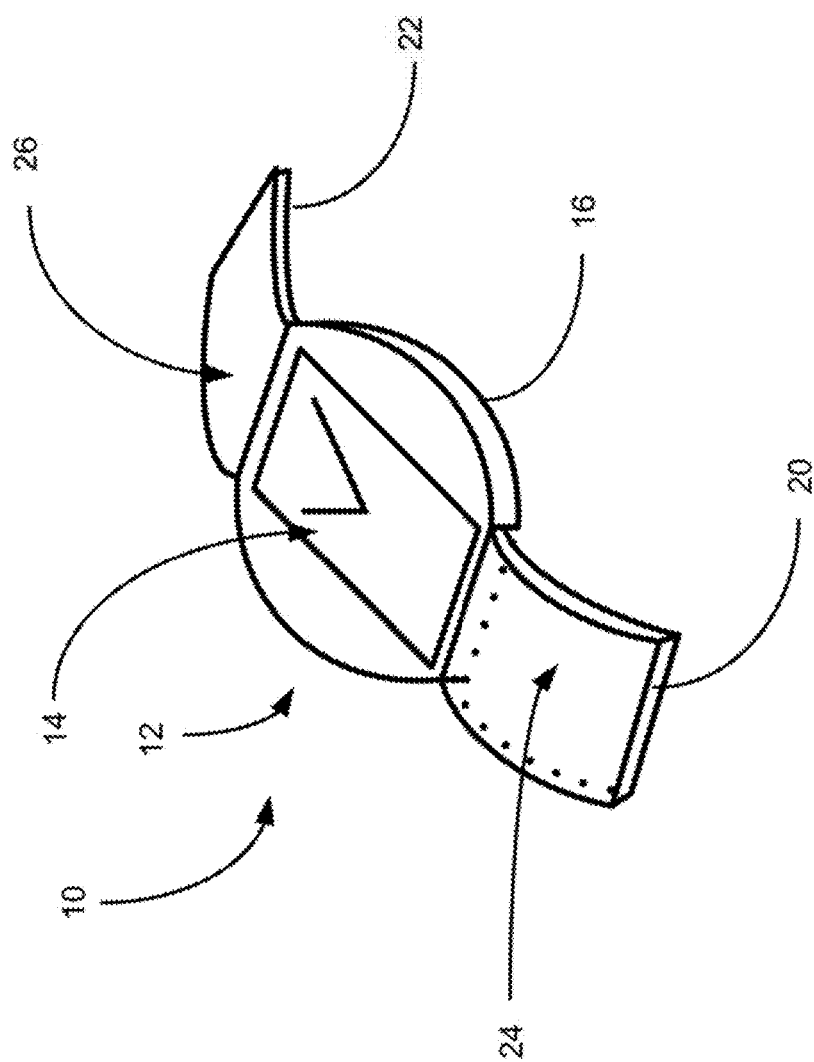
FIG. 1 is a front perspective view of a companion wrist watch in one embodiment of the present invention.

FIG. 1 is a front perspective view of a companion wrist watch 10 in one embodiment of the present invention. The wrist watch 10 includes a main body 12 having a display 14 and electronics 16. The electronics may include a processor, such as a microcontroller, wireless device, and other electronics necessary for operating the wrist watch 10. On one end of the main body 12 is a first strap 20 with a second strap 22 located on an opposing end of the main body. Each strap may include solar cells or other power modules 24 and 26.

Figure 2:
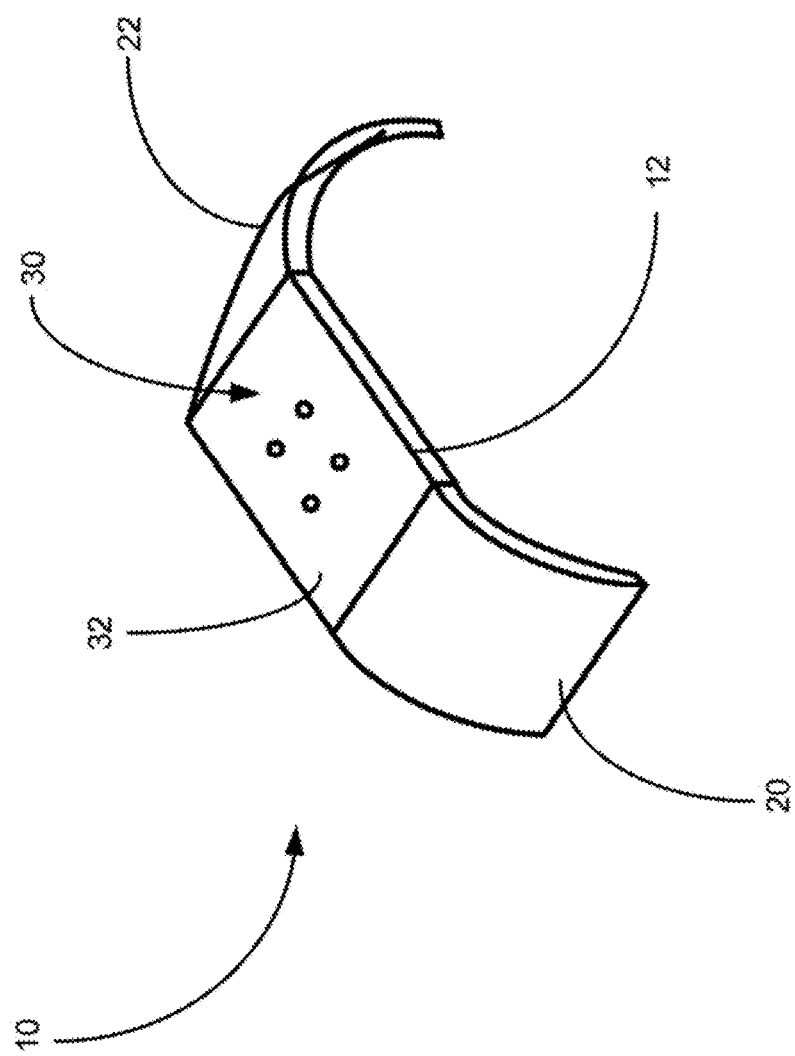
FIG. 2 is a perspective view of a bottom side of the wrist watch of FIG. 1.

FIG. 2 is a perspective view of a bottom side of the wrist watch 10 of FIG. 1. The main body 12 may include a bottom side 30 having an attachment module 32 (see FIGS. 23 and 24) for a detachable speaker or dangle.

In a normal mode, the wrist electronic displays time and date on the display surface 14. The time and date may be synchronized with a mobile network (not shown in FIG. 1). In addition, the time and date may be displayed in different formats and time zones as desired by the user.

The wrist watch by itself or in conjunction with the mobile phone, may be utilized for a voice phone call. During an incoming call, the mobile phone or mobile communications module in the watch sends a message containing information about the caller to the watch. This information is displayed on the phone and the display 14. The user can either accept or reject the call. Once accepted, voice communication is established with the mobile phone or the mobile module 110. With the mobile phone kept in silent mode, the call information can be shown on the watch with vibration and minimal disturbance to the user. The user may also use the call history or favorite phone numbers list displayed on the phone to make outgoing calls. The user may also search for contacts, although cumbersome in a small screen (i.e., display 14), to select a number and dial out. The user may also display number pad and dial out numbers on the display 14. In addition to touch screen input, a camera based input device/mouse could also be used to ease the use of selection on the display.

Additionally, the watch 10 may be utilized as a power source. It is quite common for companion devices, such as Bluetooth headsets, to require a charge often. If this additional charging task is not carried out, the companion device is not usable. The watch 10 may utilized the power modules 24 and 26 or kinetic movement to charge the battery in a power module. The use of low power display and ultra low power microcontrollers combined with light and motion charging will enable perpetual usage of the device without charging.

The wrist watch 10 may include a power management system so that the basic low power consumption modules, such as microcontroller processing, Real Time Clock and low power display are powered for long durations using the solar charge from the solar cells or any other source. The high power consumption modules, such as Bluetooth wireless or mobile wireless module, are powered for shorter periods when an additional charge is required. When the battery power is below a certain level, the high power modules can be switched off. Additional external charging would extend the period of high power consumption modules.

The watch 10 may also provide for alerts and a summary message display. The user may see summary email or SMS messages on the electronic display 14. Scheduled alerts such as meetings may also be displayed on the electronic display.

In addition, the watch 10 may be utilized as a wallet replacement. A magnetic or a Radio-frequency Identification (RFID) or Near Field Communication (NFC) wireless security authentication may be implemented as a dangle in the watch. This dongle may have real-time authentication of security through the mobile phone. The dongle may also have the electronic currency or electronic credit card validation built into it. The dynamic RFID with real-time link may act as a credit card, electronic currency or security authentication. With a security dongle and ability to display ID, most of the functions of the wallet may be implemented in the watch 10.

The watch may also be used in a client server architecture in a mobile connected embodiment or as a standalone device. The watch 10 may be used as a client to the attached mobile phone with the mobile phone acting as a server. A server application may run on the mobile phone and a client application may run on the watch. Using this embodiment, power intensive high performance applications may be implemented without adding volume or processing power in the client. The watch may act like a display device for high performance applications running in the mobile phone. The client program in the watch may collect data which is fed into the master server device (e.g., mobile phone). The master application in the mobile phone would process the data and give results to the watch.

In one embodiment, the watch may be utilized in sports and fitness activities. While playing sports or rigorous fitness, it is often hard to carry a mobile device, which can be bulky and prone to breakage. In this embodiment, the user may leave the mobile device in the vicinity of the user, although not held by the user, and still be connected to many of the functions of the mobile phone, such as make-receive calls and check messages. The watch may have sensors to collect data such as pulse rate and pedometer. The watch may use the client server architecture to store the sensor collected fitness data as hours worked, pulse rate of the user and distance walked type functions in the attached mobile device. The mobile integrated embodiment can be used as a convenient watch phone without the need for connected mobile.

Figure 3:
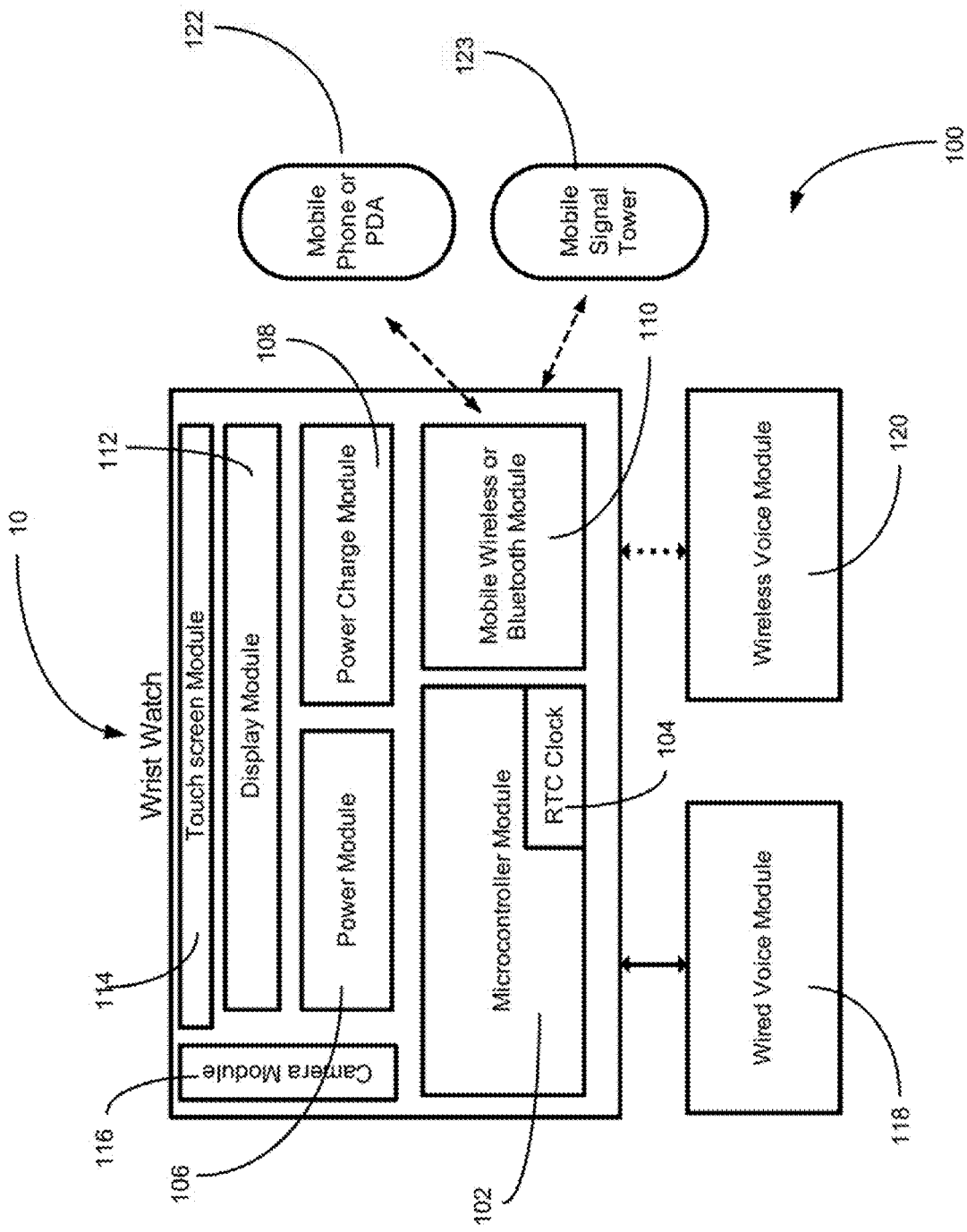
FIG. 3 is a simplified block diagram of the components of a system in one embodiment of the present invention.

FIG. 3 is a simplified block diagram of the components of a system 100 in one embodiment of the present invention. The system 100 includes a microcontroller module 102 (processor) having an Real Time Clock (RTC) Clock 104, a power module 106, a power charge module 108, a mobile wireless or Bluetooth module 110, a display module 112, a touch screen module 114, a camera module 116, a wired voice module 118 and a wireless voice module 120, which can be Bluetooth for mobile connected version and mobile wireless for a standalone version.

At the most basic level, the system 100 includes the display 14 for time and other information output, a touch screen or camera for data input, a microphone and speaker for voice input and output, the Bluetooth module 110 for communicating with a mobile phone 122, companion mobile device, battery with power management, solar or kinetic power module and microcontroller module for driving and coordinating all the functions. In an alternate embodiment where the mobile communications feature is integrated into the watch, the mobile wireless module 110 communicates via a mobile signal tower 123 to a communications network.

FIG. 3 illustrates many of the sub-systems which may be utilized with the watch 10. It should be understood that the list of components is not limited to the components illustrated in FIG. 3. Furthermore, not all of the components are necessary for the system 10 to function and remain in the scope of the present invention. The microcontroller module 102 drives and integrates all the sub-system modules. It maintains its own time using the RTC clock 104, which is synchronized with the paired mobile phone 122 periodically. The RTC may have its own long term battery to power it for long periods to maintain the internal time without the link to the companion mobile phone. The clock time and date data is used as a primary display for the display module 112. Although a mobile phone is depicted, any mobile communication device may be utilized with the watch 10, such as a tablet, Personal Data Assistant (PDA), etc.

The wireless/Bluetooth module 110 may be used to establish a connection with the mobile phone, exchange data with the mobile phone and establish voice channel communication with the mobile phone. The voice channel on the watch, either wired or wireless, is used for user conversations. The voice modules 118 and 120 (both wired and wireless) may include an independent voice channel with the mobile phone or mobile tower, speaker and microphone. The speaker and microphone may be either part of the watch with the telescopic dongle or independent wireless dangle.

The display module 112 may be a general purpose graphical display to display time information, call indications, message information or any other data to be presented to the user. The display module may use an Liquid Crystal Diode (LCD), Organic Light-Emitting Diode (OLED) or any other graphical display technologies with power saving built into the design. The display module may be integrated with the touch screen module 114 for user input.

The power module 106 may be designed to work off a chargeable battery with prudent power management. The power charge module may use solar power or mechanical kinetic movement of the wrist and continuously charge the battery when power is available. In the preferred embodiment of the present invention, the complete system 100 may be built using the maximum power saving components such as ultra low power micro controller, power saving OLED type displays and low power speakers to help the power management. The power management may be designed to switch off the high power and medium power modules when the battery level goes below certain levels. At a low battery level, Bluetooth can be put in a low energy mode where only the low power key functions are enabled to support basic watch operation for a long period.

FIGS. 1-3 and U.S. patent application Ser. Nos. 13/539,565 and 13/353,528 discussed using directional sound through the users palm to provide an audio interface with a mobile phone or other mobile communication device. In one embodiment, the present invention utilizes a form of directional sound with a sealed side firing speaker to project the sound to a user's palm for better sound with compact implementation. The directivity of the sound is combined with a palm-ear-wrist seal area to project the sound in sealed cavity of the users cusped hand. This direction sound enables private conversations or "private calling" where the user may conduct a conversation without the incoming callers voice being broadcast to others.

FIG. 4 is a front view of a user 200 using a side firing speaker 202 in one embodiment of the present invention. The side firing speaker 200 fires the sound 204 at the bottom 206 of the user's palm towards the users palm 208 clasped around the user's ear 210. The sound 204 emanating out at the bottom of the palm may have some directivity and be further contained by the user's hand 212 and cheek 214. The sound is directed towards the bottom of the palm 208 within the contained area of the clasped palm. The users clasped palm 208 and the user's ear pinna contain and amplify the sound to the ear. This not only produces very good quality sound, it also minimizes the leak from outside the palm 208, creating a private calling experience. As illustrated in FIG. 4, the side firing speaker 200 fires the sound directly toward the clasped hand of the user. FIG. 5 is a front view of the side firing speaker 200 firing the sound 204 at a steep 90 degree angle, hitting directly at the bottom of the palm and guided towards the clasped palm area of the user.

The speaker 200 normally fires the sound straight in front of its surface. In one embodiment, an enclosure sits in front of the speaker and directs the sound to the side of the speaker. As depicted in FIG. 4, the palm 208 directs the sound. This side firing enclosure may be designed to either fire the sound sideways towards the palm or fire the sound directly in front for normal speaker mode operation.

Figure 6:
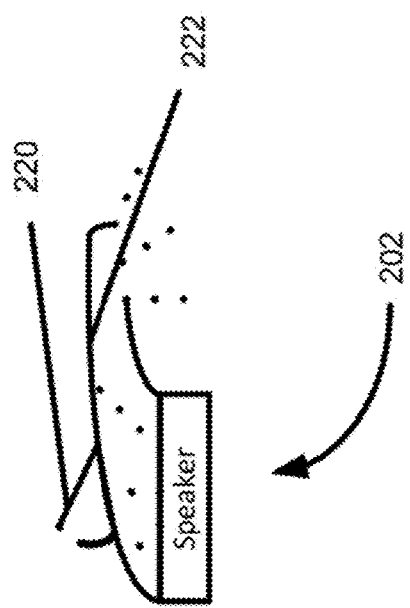
FIG. 6 is a side perspective view of the speaker with a flip open door in one embodiment of the present invention.

FIG. 6 is a side perspective view of the speaker 200 with a flip open door 220 in one embodiment of the present invention. As depicted in FIG. 6, a dome type side firing chamber 222 directs the sound to the side of the speaker and towards the bottom of the user's palm. The speaker includes the flip open door 220 on the top surface of the chamber 222. Sound fires directly in front of the speaker while the door is opened. In this configuration, there is minimal sound going towards the palm. This open door mode can be used for a speaker mode hands-free operation. When the door is closed, the speaker fires the sound to the palm, thereby providing a private mode.

In another embodiment of the present invention, a slider tube 230 may be utilized. FIG. 7 illustrates a front perspective view of a slider 230 located on top of a speaker 232 in another embodiment of the present invention. The slider may be a tube which is positioned on a guide 236 having slots 238 to accommodate side firing and top firing sound broadcasting. FIG. 8 is a side view of the slider 230 in a closed position. In a closed position of the slider, the slots 238 are lined up so that the sound 204 goes directly from the speaker to the front of the speaker for hands-free speaker mode. FIG. 9 is a side view of the slider 230 in the open position. In the extended or open position of the slider, the slots 238 are closed and the sound 204 travels through the slider and fires at the end to the bottom of the user's palm. When the user is driving in a car, the bottom of the user's wrist points towards the user's face. The slots are designed for a hands-free mode which may direct the sound towards the driver.

Figure 10:
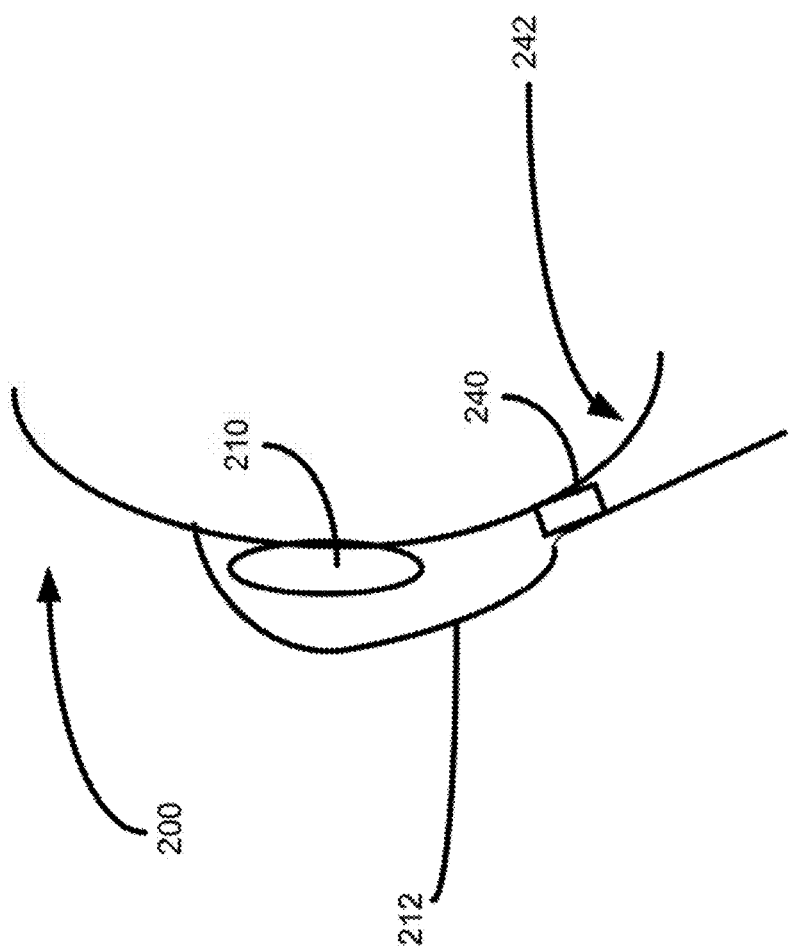
FIG. 10 is a front view of the vibration speaker positioned against a user's jaw.

A speaker typically transmits sound through vibrations in the air. The present invention as discussed in FIGS. 1-9 discusses using directional sound to direct all the sound to the ear. However, the devices discussed in FIGS. 1-9 still leak sound to the external environment. This leakage can be minimized by using vibration speakers that make contact to the user's jaw bone while the user's palm is held against the ear. In one embodiment, a vibration speaker 240 is attached to the bottom of a wrist watch towards the bottom of the user's palm. When the user holds the user's palm to the user's ear, the vibration speaker 240 makes contact with the jaw bone of the user. FIG. 10 is a front view of the vibration speaker 240 positioned against a user's jaw 242. As illustrated in FIG. 10, the vibration speaker is held against the jaw 242 of the user. This contact to the jaw bone enables the transmission of the sound vibrations to the ear through the user's skull bone structure. The vibrations between the wrist and jaw bone also reverberate within the confined area of the palm to produce a louder sound to the ear.

The vibration speaker 240 illustrated in FIG. 10 does not generate much sound until it makes contact with the facial bones (e.g., jaw) of the user. To utilize the vibration speaker 240 as a speaker phone (for hands-free mode), a slider plate of glass or any vibrating material may be slid on top of the vibration speaker (not shown). This plate may act as a resonant vibrator and generate regular sound through the air. The vibration speaker may work as both a private hands-on bone conduction speaker and a hands-free loud speaker with a slide of a plate.

Figure 11:
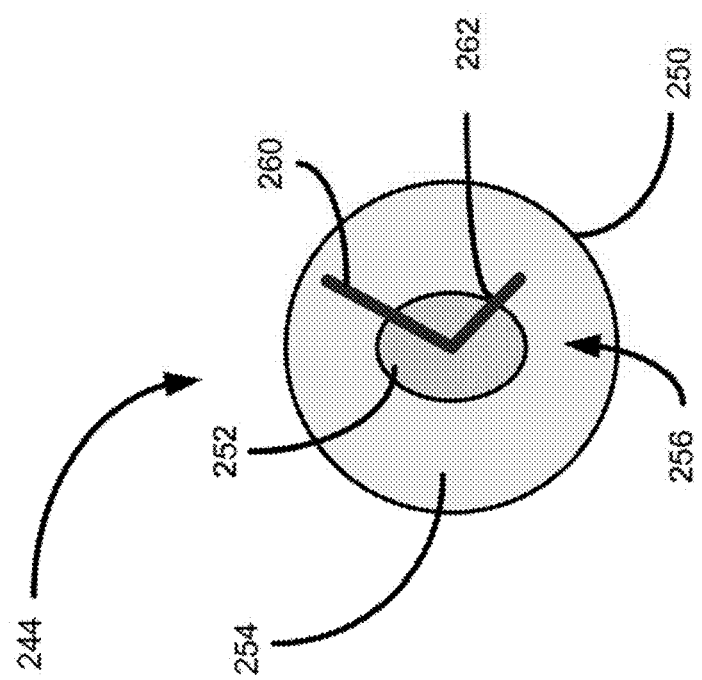
FIG. 11 is a front view a watch face in one embodiment of the present invention.

In one embodiment, the present invention utilizes a wrist watch having a combination digital and analog display with a partial dial containing a digital display. FIG. 11 is a front view of an electronic module 244 having a watch face 250 in one embodiment of the present invention. As illustrated in FIG. 11 the watch face 250 includes an area 252 providing for analog or mechanical movement located in the center of the watch with a surrounding area 254 having a digital printed circuit board (PCB) 256. The analog movement drives the hands 260 and 262 of the watch. The PCB 256 may include a micro controller and digital circuits for driving a digital display and digital logic of the watch.

Figure 12:
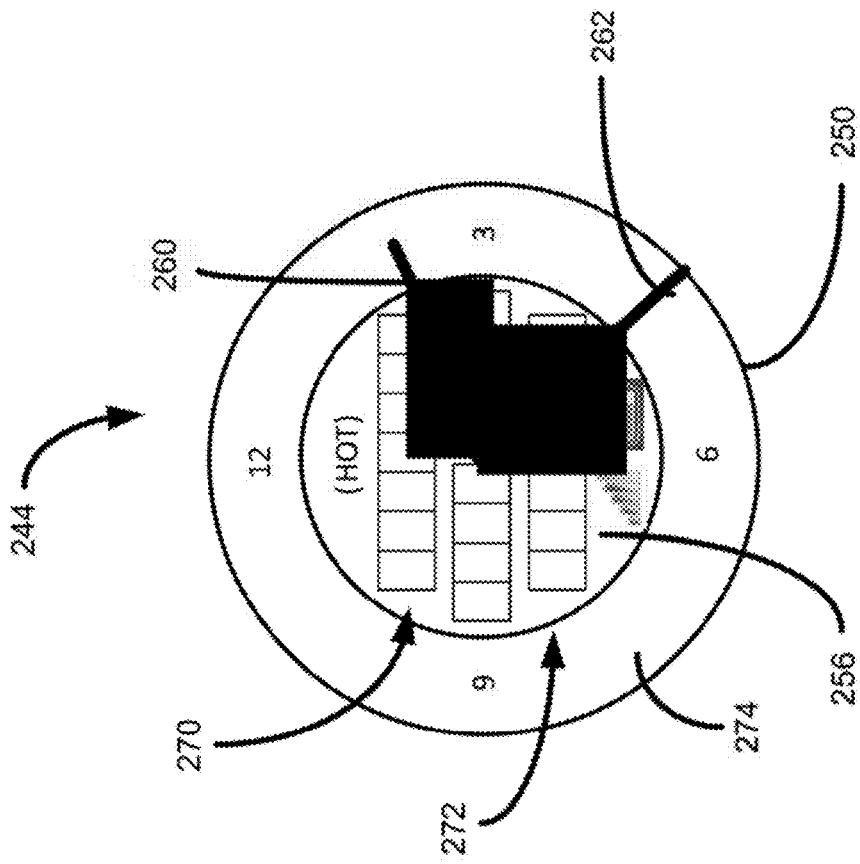
FIG. 12 is a front view of the watch face illustrating a partial view of an interior of the watch face.

FIG. 12 is a front view of the electronic module 244 with the watch face 250 illustrating a partial view of an interior 270 of the watch face. The watch face includes a digital display 272 located in the center portion of the watch while a mechanical dial 274 is located surrounding the display. In an alternate embodiment, the watch face includes only the digital display 272 with the PCB without the analog mechanical movement.

Figure 13:
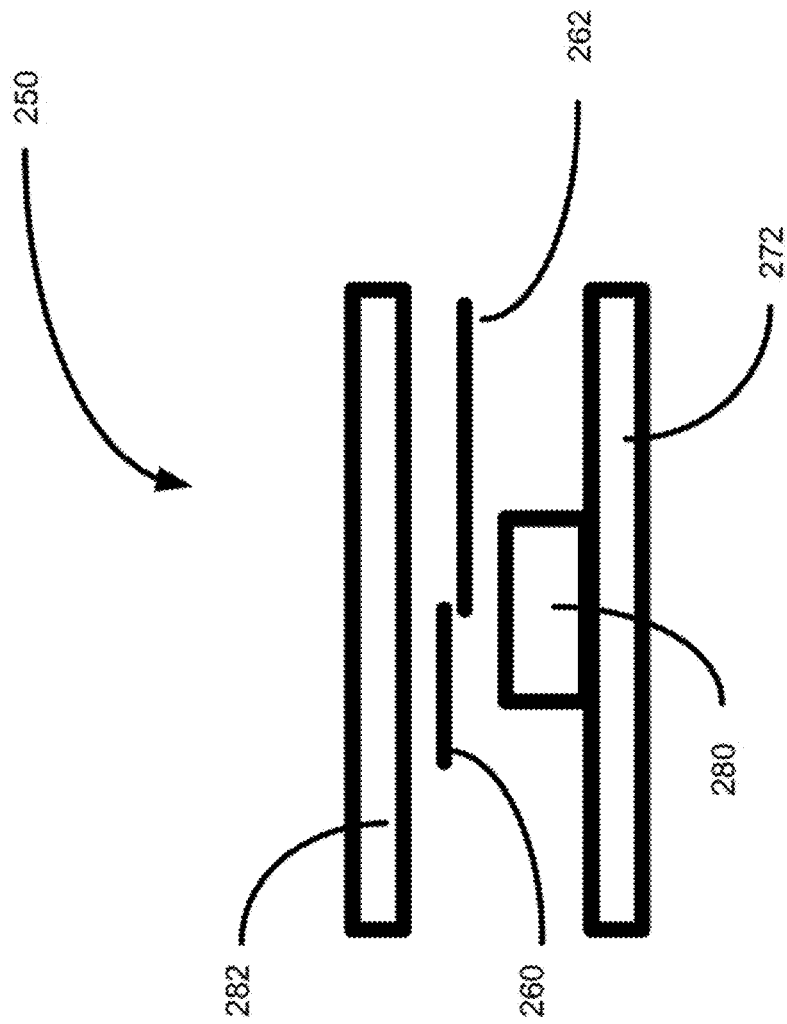
FIG. 13 is a top view of the watch face in one embodiment of the present invention.

An issue with utilizing an analog/digital combination is associated with putting a hole in the middle of the display to allow the analog time hands to connect to the movement mechanism below. This hole is a technical problem in many displays as LCD technology does not support placing holes in the panel. In one embodiment, the analog watch mechanism is positioned in front of the digital display. FIG. 13 is a top view of the watch face 250 in one embodiment of the present invention. The electronic display includes the digital display 272 with a watch movement mechanism 280 and the hands 260 and 262 overlaying the digital display. A top protective glass 282 or other transparent material may be placed over the entire electronic display. Thus, it is no long necessary to place a hole in the digital display. As illustrated in FIG. 13, the watch movement mechanism 280 sits on top of the digital display 272. The watch movement mechanism runs the hour and minute hands 260 and 262. The watch top protective glass 282 sits in front of the mechanism. Thus, the user would see the watch hands, mechanism and uncovered area of the display. By using a small watch movement mechanism, only a small portion of the digital display is hidden. The watch movement mechanism may be held in place on the display with a matching slot on the front surface of the display. The watch movement mechanism may also be held with other transparent mechanical supports connected to the watch face 250.

Figure 14:
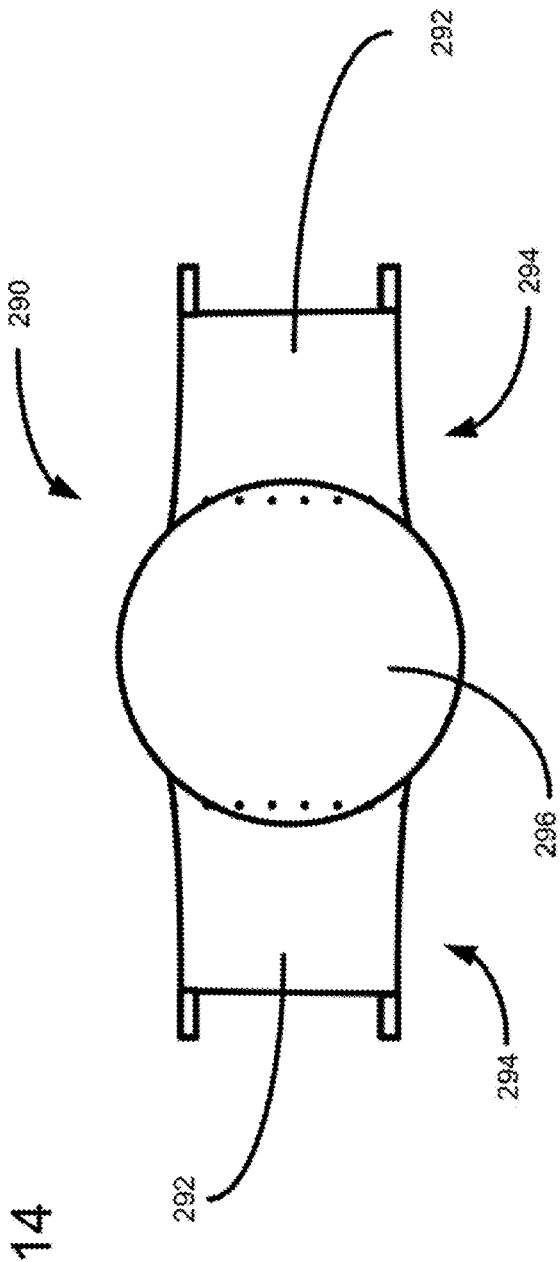
FIG. 14 is a top view of a wrist watch having a battery in the strap of the watch.
Figure 15:
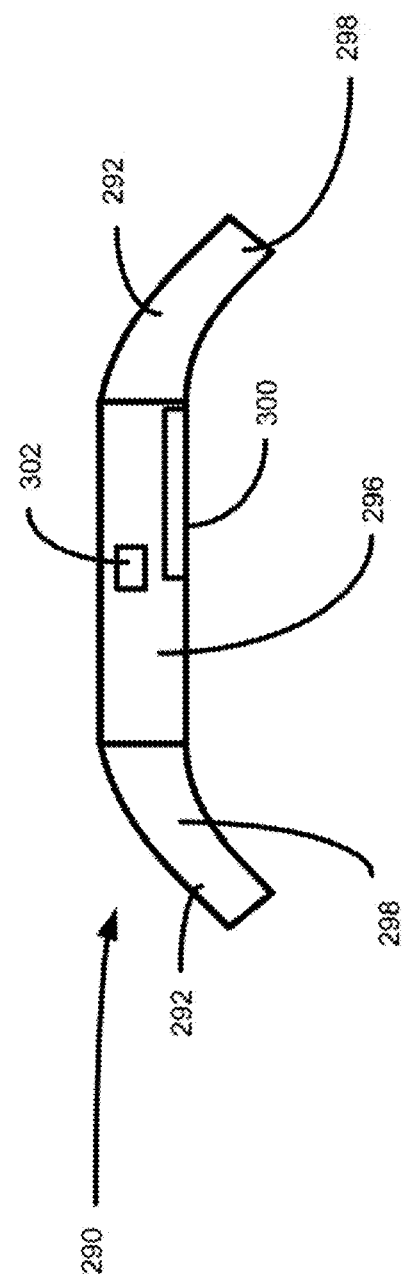
FIG. 15 is a side view of the watch.

To conserve space and utilize the maximum battery life for the digital functions, the present invention may incorporate batteries in one or both watch strap. FIG. 14 is a top view of a wrist watch 290 having a battery 292 incorporated in straps 294. FIG. 15 is a side view of the watch 290. In one embodiment of the present invention, a watch case 296 is extended with wings 28 on either side. These wings 298, which may have an appearance of a metal watch strap, have a sealed water proof cavity to secure the battery 292. In another embodiment of the present invention, a metal strap having connected large links may be utilized. Each link may include an embedded small chargeable battery. These connected batteries in the links may provide enough capacity to drive the watch without consuming additional space outside the strap. In still another embodiment, the battery is embedded in a leather strap that carries a thin ribbon cable through the interior of the strap to transmit the battery power to the watch. Furthermore, a vibrator motor 300 may be integrated into the bottom of the case 296. The bottom of the watch case, which always makes full contact with the top of the user's wrist, provides an ideal surface to indicate through vibration that a call is incoming. The batteries in the straps of the watch and the vibrator motor in the bottom of the watch case may be incorporated into any wrist watch and still remain in the scope of the present invention.

Figure 16:
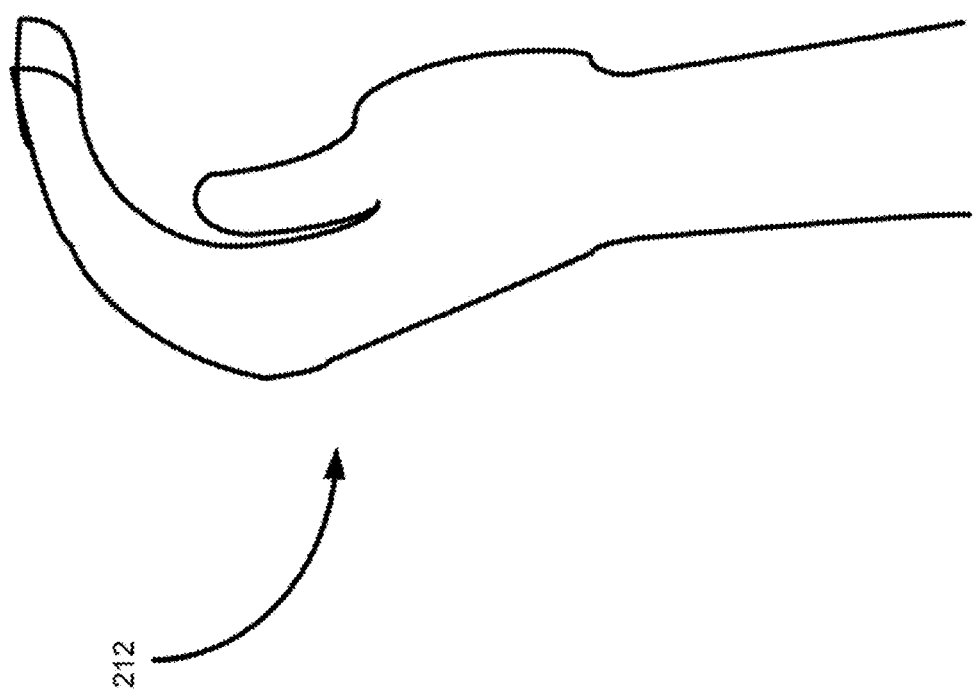
FIG. 16 is a side view illustrating the orientation of a user's hand for answering an incoming phone call.

The present invention may also utilize tilt sensors, gyros, or accelerometers 302 (see FIG. 15) to detect the orientation of the hand. Gestures of the users hand may be used as an interface for controlling the watch. Thus, specific gestures may correspond to specific operations on the mobile communication device. When a user lifts his hand and moves the palm to the user's ear to answer the phone call or make a phone call, the orientation of the sensor 302 changes to a vertical axis. This change in orientation may be used to answer an incoming phone call. FIG. 16 illustrates the orientation of a user's hand 212 for answering an incoming phone call. When the user moves his hand down, this gesture can be used to mute the call. The user may use various hand gestures to control a call. For example, when a user lifts his hand when there is no incoming call, the sensor 302 in the watch senses this gesture, and interprets the gesture by the microcontroller module 102 to command that "dial out" screens be displayed on the digital display 272. FIG. 17 illustrates a user's hand 212 twisting his hand to read the watch. When the user 200 twists his hand 212 to read the watch, the sensor 302 detects the tilt in the hand axis. FIG. 18 is a side view of the watch 290 with the orientation shown in FIG. 17. This tilt is used to initiate a refresh command on the time in the digital display or illuminate the dial. A slight tilt can refresh time while a larger tilt may illuminate the watch. In another example, when the user makes a gesture of twisting his hand (as he does while unlocking a physical door), this twist is detected and used to unlock the locked screen on the watch. During jogging, a user typically swings his hands. The sensor 302 may be used to detect this jogging and send the detected movement to the microcontroller module to command that a health monitor screen of the watch be enabled when jogging is detected by the sensor. During an incoming call, shaking of the user's hand can be used to reject the call. When a user moves his hands, such as when gesturing goodbye, this may be utilized to command the ending of a call. Furthermore, when the user moves his wrist horizontally, this gesture may be used to command the movement of a mouse in an attached computer or smart device.

A single accelerometer may be used to detect tilt in multiple axes to take multiple actions. These tilt-based actions not only gives the user convenience, where the user does not have to use menus, it may also save power by refreshing the time or switching on illumination of the watch only when desired by the user. Thus, a sensor or accelerator or plurality of such may be utilized to detect movement of the watch, send the detect movements to the microcontroller module 102, and send an appropriate command to the watch. Furthermore, the sensor may detect drastic movements, such as when a user falls, and transmits an emergency message or dials and calls a specified emergency number (e.g., 911) or other designated number.

In another embodiment of the present invention, the watch may incorporate E-paper or memory LCD technology for use with the watch face 250 (see FIGS. 19 and 20). E-paper display technologies are designed to mimic the appearance of ordinary ink on paper. Unlike conventional backlit flat panel displays which emit light, E-paper displays reflect light like ordinary paper, making it more comfortable to read and giving the surface a wider viewing angle compared to conventional displays. The E-paper consumes power only during refresh. The display could be refreshed once a minute to update time or as desired dependent upon the connected mobile's signal level or battery charge. This refresh may also be limited to only when the user reads the watch during the tilt of the user's hand. The rest of the time the display would not consume any power. Memory LCD technology works in a similar fashion as E-Paper and may be used to display information on the watch.

The watch utilizing E-paper technology may also provide a display similar to a physical clock dial. In normal operation, the E-Paper display may be made to look similar to an analog clock with rotating hands. A dual pattern display can be achieved while the E-paper pattern is changed. The analog looking watch becomes digital only during call or when the digital functions are needed.

In another embodiment of the present invention, the digital display 272 may be constructed of organic, transparent OLED material, which may appear as a normal analog watch with transparent glass on top. In this embodiment, the digital display is a transparent glass which illuminates with a character display only during calls or when the digital functions are needed. The illumination of the OLED glass also provides night time reading without use of an additional LED. The tilt display automation may also be applied for the OLED display.

FIG. 19 is a front view of the watch face 250 illustrating a first menu 320 display in one embodiment of the present invention. The display may utilize the OLED material or the E-paper display described above. Other visual types of displays may be utilized in other embodiments. The dial display of the watch may have a touch screen having a plurality of menu functions. The E-paper or Transparent OLED may display current action items for each of the menu functions. As depicted in the menu 320, the display may show setup, call or silence in one segment, an answer or up scroll, in another segment, and a down or reject in another segment. FIG. 20 is a front view of the watch face 250 illustrating a second menu 322 display in another embodiment of the present invention. In this second menu, one segment may be a setup selection, while another selection may be an answer command and another segment may be a reject command. During incoming calls, the menu functions may display commands of silence, answer or reject. The user may then push whichever command is desired. Likewise, during an outgoing call, the menu functions of call, and up/down commands (for scrolling numbers) may be displayed.

Figure 21:
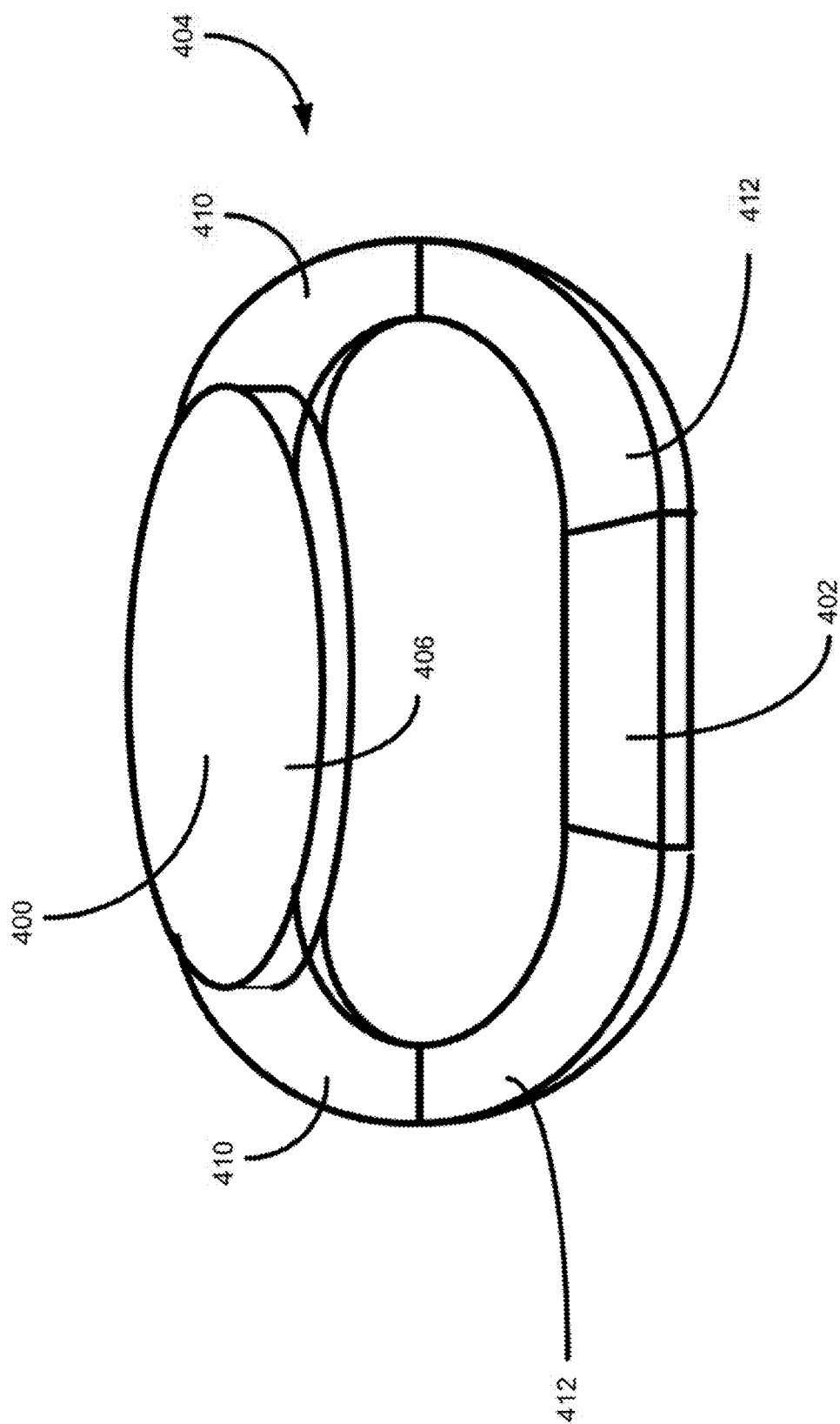
FIG. 21 is a top perspective view of a watch having the separated display module and the audio/Bluetooth module.

The present invention may split a watch into two separate components, a display module 400 and an audio/Bluetooth module 402. FIG. 21 is a top perspective view of a watch 404 having the separated display module 400 and the audio/Bluetooth module 402. The display module may be located on top of the user's wrist and the audio/Bluetooth module located at the bottom of the user's wrist. The display module may include a microcontroller unit (MCU) 406 and is attached to battery enclosure wings 410 on each side of the display module. A leather or metal strap 412 may include an embedded ribbon cable which connects the electronics within the display module 400 on top of the wrist with the electronics of the audio/Bluetooth module 402 on the bottom of the wrist. The strap 412 may be designed with an offset so that the audio interface is offset with respect to the display module. Additionally, this offset may help move the audio interface closer to the palm of the user for better audio firing.

Figure 22:
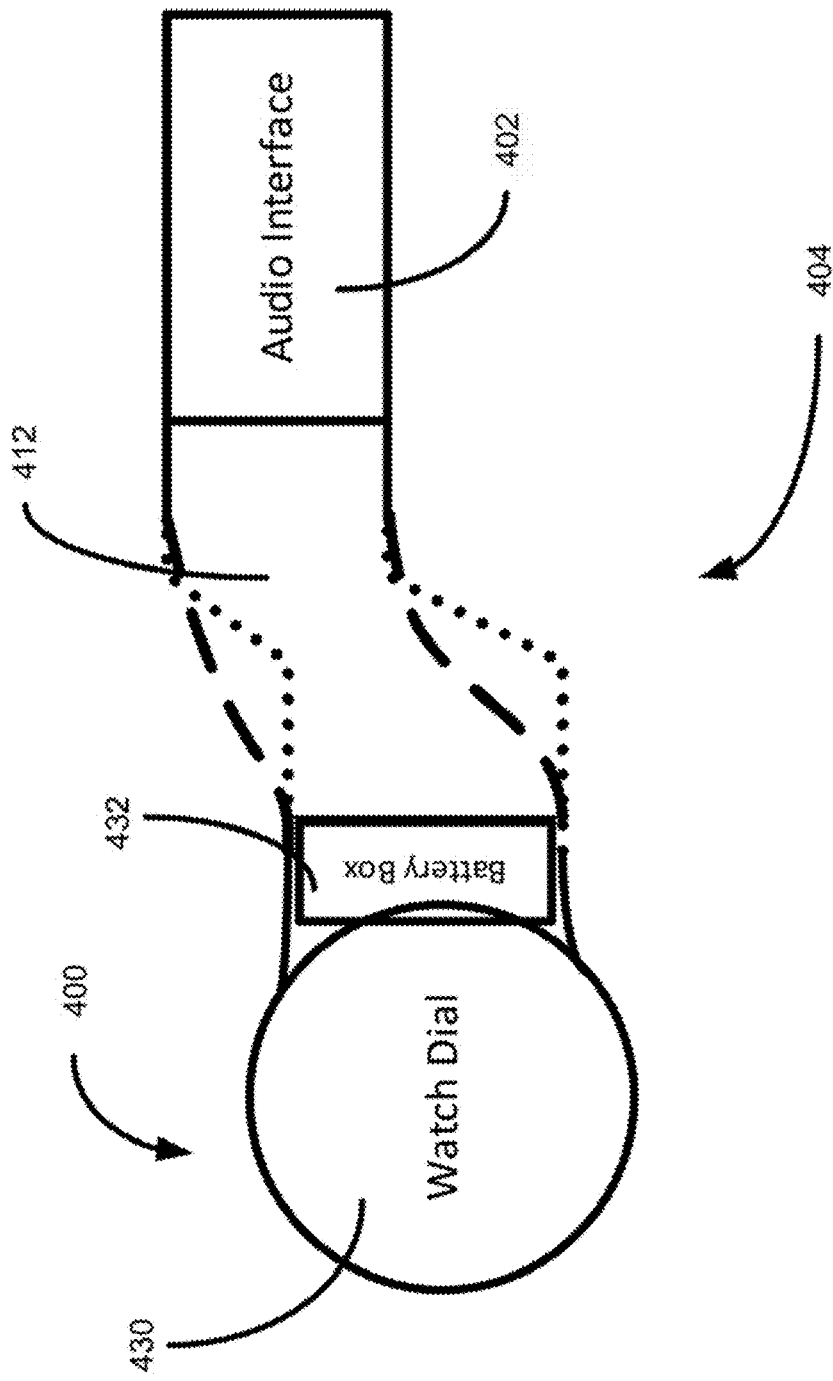
FIG. 22 is a top view of the display module and the strap.

FIG. 22 is a top view of the display module 400 and the strap 412. The display module includes a watch dial 430 and may include a battery box 432 for retaining batteries. The audio/Bluetooth module 402 is shown at the end of the strap 412. The watch strap 412 may be designed in such a way that it can be locked in place around the wrist with slack. It can later be tightened by pulling the strap to make it a tight fit around the wrist. A magnetic latching mechanism may be provided between two ends of the open strap. Once the magnets lock is in place, it provides a large loop around wrist. The strap is further pulled for a tight fit around the wrist using a buckle or other fastening device.

FIG. 23 is a front view of a portable speaker 500 attached to a watch 502. FIG. 24 is a top view of the portable speaker module 500 removed from the watch 502. The compact speaker module 500 may utilize the vibration speaker 240 (i.e., bone conduction speaker) with the wireless interfaces discussed above. The portable speaker module may include a compact battery 504 to last for a short period. This removable module 500 is attachable to the audio module at the bottom of the watch strap. During a call, the removable module is removed from the watch and held behind the user's ear, concealed behind the ear pinna. This module 500 may communicate with the watch to play the phone audio channel. When connected to the watch, the module 500 may be charged from the higher capacity battery of the watch.

Although the present invention has been described as a wrist watch, the present invention may be embodied in any mobile device capable of being carried or worn. The present invention is a wrist watch, a finger ring or other mobile carriage device that communicates with a paired mobile device, such as mobile phone or PDA and provides interface to use of many of the functions of the mobile device without the need to open the bulkier counterpart for frequently used operations. These supported functions include receiving and making phone calls, checking incoming calls, checking messages, checking synchronized time, etc. The wrist watch may also monitor the presence of the larger mobile device and trigger an alarm during the loss of the mobile phone.

Furthermore, the wrist watch may be a stand-alone mobile communication device, or mobile phone, without the necessity of a companion mobile communication device. There are other existing mobile phone wrist watches, however the present invention utilizes directional sound as discussed above to allow for private calling or conversations. All of the hardware of the mobile phone may be incorporated within the wrist watch. In one embodiment, the watch 10 of FIG. 1 may incorporate a mechanism (mobile module 110) allowing wireless communications with other mobile communication devices. The watch 10 may include the wireless communications mechanism as a fully integrated part of the watch.

Figure 25:
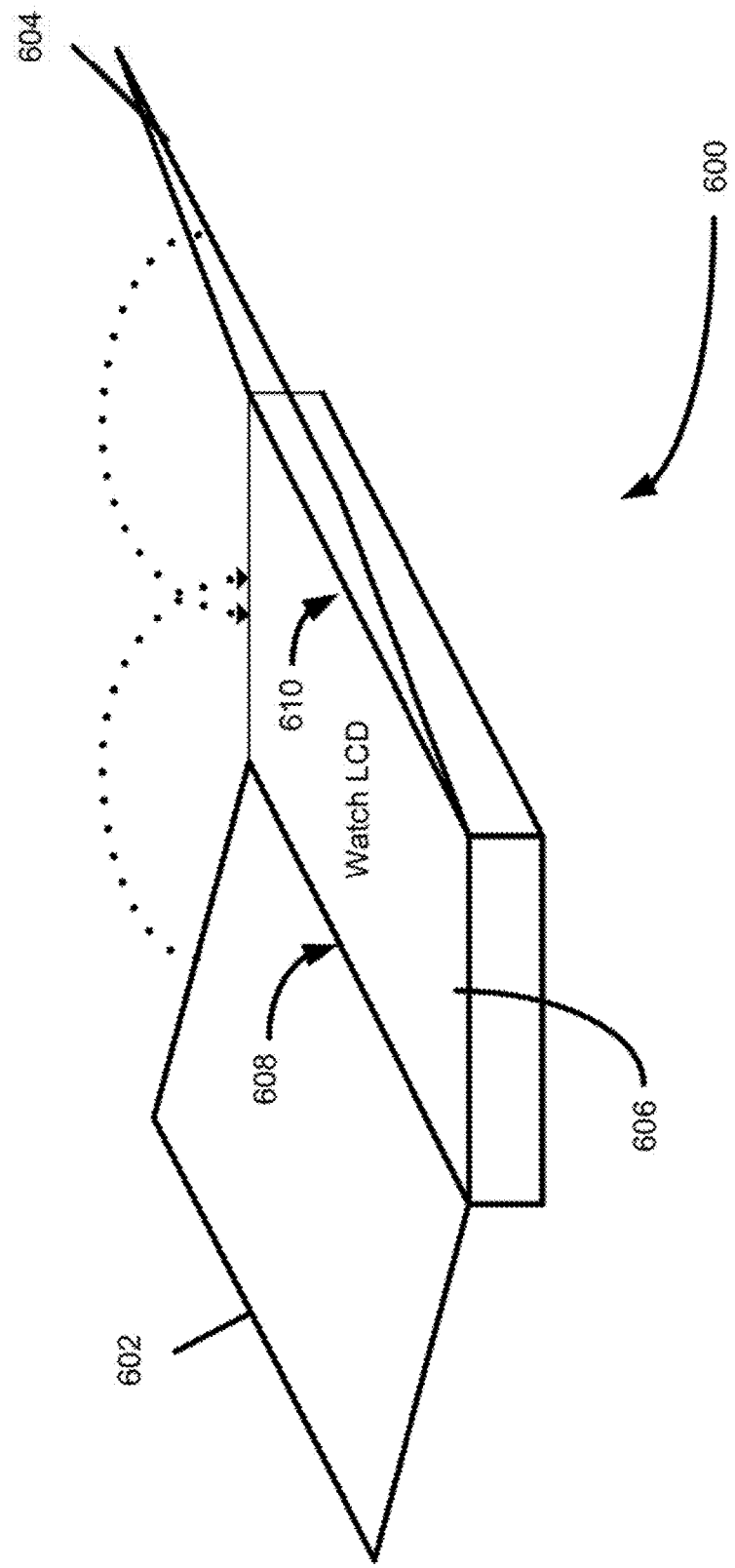
FIG. 25 is a front view of the fully opened watch in one embodiment of the present invention.

In still another embodiment, a wrist watch 600 may be provided with an enlarged interface area for user input (user input area). FIG. 25 is a front view of the fully opened watch in one embodiment of the present invention. The watch may include one or more bezels 602 and 604. As depicted in FIG. 25, there are two bezels, but it should be understood by those skilled in the art that the watch may include one bezel or more than one bezel. The bezels may open up from a top case 606 of the watch to provide a larger keyboard area. These bezels may be either open frame bezels or bezels with a transparent plastic plate overlaying a top surface of the bezel or a bezel with transparent display such as TOLED. The bezels may flip open on both sides of the Watch LCD to provide 3 times the area for touch input. The bezels may be hinged on either side of the top case 606 of the watch at pivot points 608 and 610. The bezels may have capacitive proximity touch sensors 614 on the periphery of the frame (see FIG. 26). When a user puts his finger in the middle of the frame, the capacitive sensors along the periphery detect the change in capacitance. Depending on the capacitance change for different sensors along the periphery, the position of the finger is detected in the middle of the bezel frame.

Figure 26:
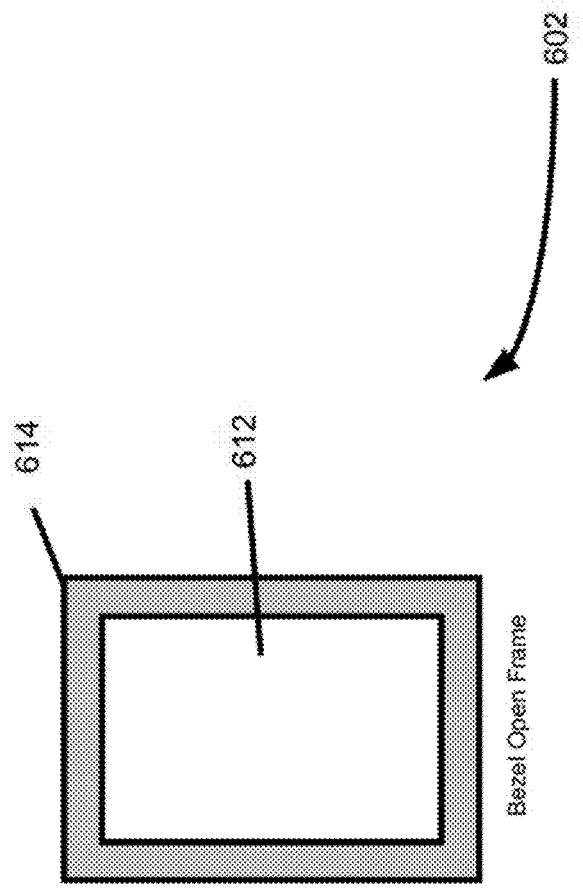
FIG. 26 is a top view of a bezel with an open frame.

FIG. 26 is a top view of a bezel 602 with an open frame, glass or transparent display 612. The open frame, glass or transparent display is preferably located in the middle region of the bezel. The frame may include proximity touch sensors 614.

FIG. 27A is a top view of a user's finger 630 on a right bezel 602. FIG. 276 is a top view of a normal display 632 of the watch 600. FIG. 27C is a top view of a user's finger 630 on a left bezel 604. The watch display 632 (without the bezels) with its touch panel provides limited character input. For a watch of size 25 mm×30 mm, a maximum of 12 characters (4 rows by 3 columns) can be provided for easy finger touch. Beyond this, it would be harder for users with large fingers to select characters. The bezel 602 that opens on the right of the watch will provide additional 12 characters. Similarly the bezel 604 that opens on the left side will provide 12 more characters. With 2 bezels and the watch display 632, a 36 character input can be provided on a 25×30 mm size LCD watch. The watch may display middle characters of the keyboard in normal mode. When the user moves his finger 630 in the right bezel area 602, the right $\frac{1}{3}^{rd}$ characters are displayed on the watch LCD. As the user moves his finger around the bezel, a mouse type movement may then be enabled on the main display. When the user pushes his finger 630 onto the bezel, the proximity of the depressed area is detected and the corresponding displayed LCD character is selected. Similarly, the finger movement in the left bezel 604 enables the left $\frac{1}{3}^{rd}$ character on the watch display 632. The Virtual keyboard may be provided from the bezel frame and corresponding position of character on the display 632. FIG. 27D is a top view of the display 632 and bezels 602 and 604 in another embodiment of the present invention. In this embodiment, the bezel can have a transparent display to display actual characters on the center display and both bezels.

Figure 28:
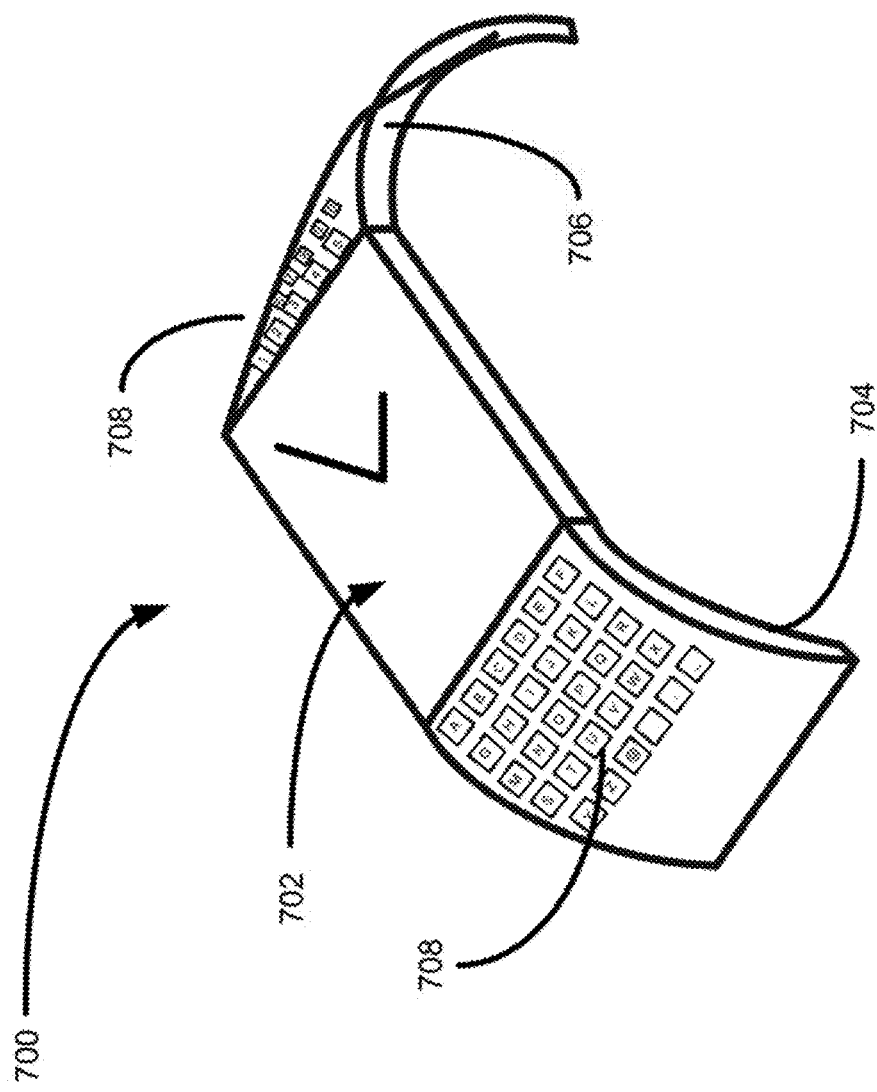
FIG. 28 is a front view of a watch in another embodiment of the present invention.

FIG. 28 is a front view of a watch 700 in another embodiment of the present invention. In this embodiment, the watch includes an enlarged user input area 702. The watch includes straps 704 and 706, each having an alphanumeric keypad 708. The alphabets, numbers and other symbols may be printed on both straps. The strap facing the user can have more alphabet inputs, while the strap facing away can have less number of inputs. The strap may have a proximity sensor (or any other sensor) embedded to detect the touch (or proximity) of the finger for each key. While FIG. 28 illustrates a standard ABCD layout, the key layout may be Qwerty or any other format for a users convenience and still remain in the scope of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A watch worn by a user, the watch comprising:
   a mobile communication device integrated into the watch, the mobile communication device providing wireless communications with other communications devices;
   an electronics module integrated into the watch, wherein the electronics module includes an interface for interfacing with the mobile communication device integrated into the watch;
   wherein the user interfaces with the electronic module to perform operations upon the mobile communication device; and
   a mechanism for projecting directional sound to an ear of the user for private calling.

2. The watch according to claim 1 further comprising a display for use with the interface.

3. The watch according to claim 2 further comprising at least one pivotable bezel, the bezel providing a touch panel for controlling the display.

4. The watch according to claim 3 wherein placement of a finger of a user on the bezel enables selection of a character on the display.

5. The watch according to claim 3 further comprising a second pivotable bezel, the second bezel providing a touch panel for controlling the display.

6. The watch according to claim 3 where the bezel includes a transparent display to display keys to be pressed.

7. The watch according to claim 1 further comprising a plurality of straps, each strap having a plurality of alphanumeric characters printed on a portion of the strap, wherein the plurality of alphanumeric characters are an input device using a plurality of sensors.

8. The watch according to claim 1 wherein the mechanism for projecting direction sound is a parabolic reflector for redirecting the sound to an ear of the user.

9. The watch according to claim 8 wherein a palm of the user is utilized as the parabolic reflector.

10. The watch according to claim 8 wherein the parabolic reflector redirects sound to a palm of the user.

11. An apparatus worn by a user, the apparatus comprising:
an attachment device for attaching the apparatus to the user;
an interface for wirelessly using a separate companion mobile phone from the apparatus;
wherein the user interfaces with the apparatus to perform operations upon the mobile phone;
a mechanism to establish a voice channel with the mobile phone for performing phone operations through the mobile phone;
a mechanism for projecting directional sound for private calling; and
an enlarged user input area.

12. The apparatus according to claim 11 wherein the enlarged user input area includes a pivotable benzel.

13. The apparatus according to claim 12 wherein placement of a finger of a user on the bezel enables selection of a character on the display.

14. The apparatus according to claim 12 further comprising a second pivotable bezel, the second bezel providing a touch panel for controlling the display.

15. The apparatus according to claim 12 where the bezel includes a transparent display to display keys to be pressed.

16. The watch according to claim 11 further comprising a plurality of straps, each strap having a plurality of alphanumeric characters printed on a portion of the strap, wherein the plurality of alphanumeric characters are an input device using a plurality of sensors.

17. The apparatus according to claim 11 wherein the mechanism for projecting direction sound is a parabolic reflector for redirecting the sound to an ear of the user.

18. The apparatus according to claim 11 wherein a palm of the user is utilized as the parabolic reflector.

19. The apparatus according to claim 18 wherein the parabolic reflector redirects sound to a palm of the user.

* * * * *